Patented June 7, 1927.

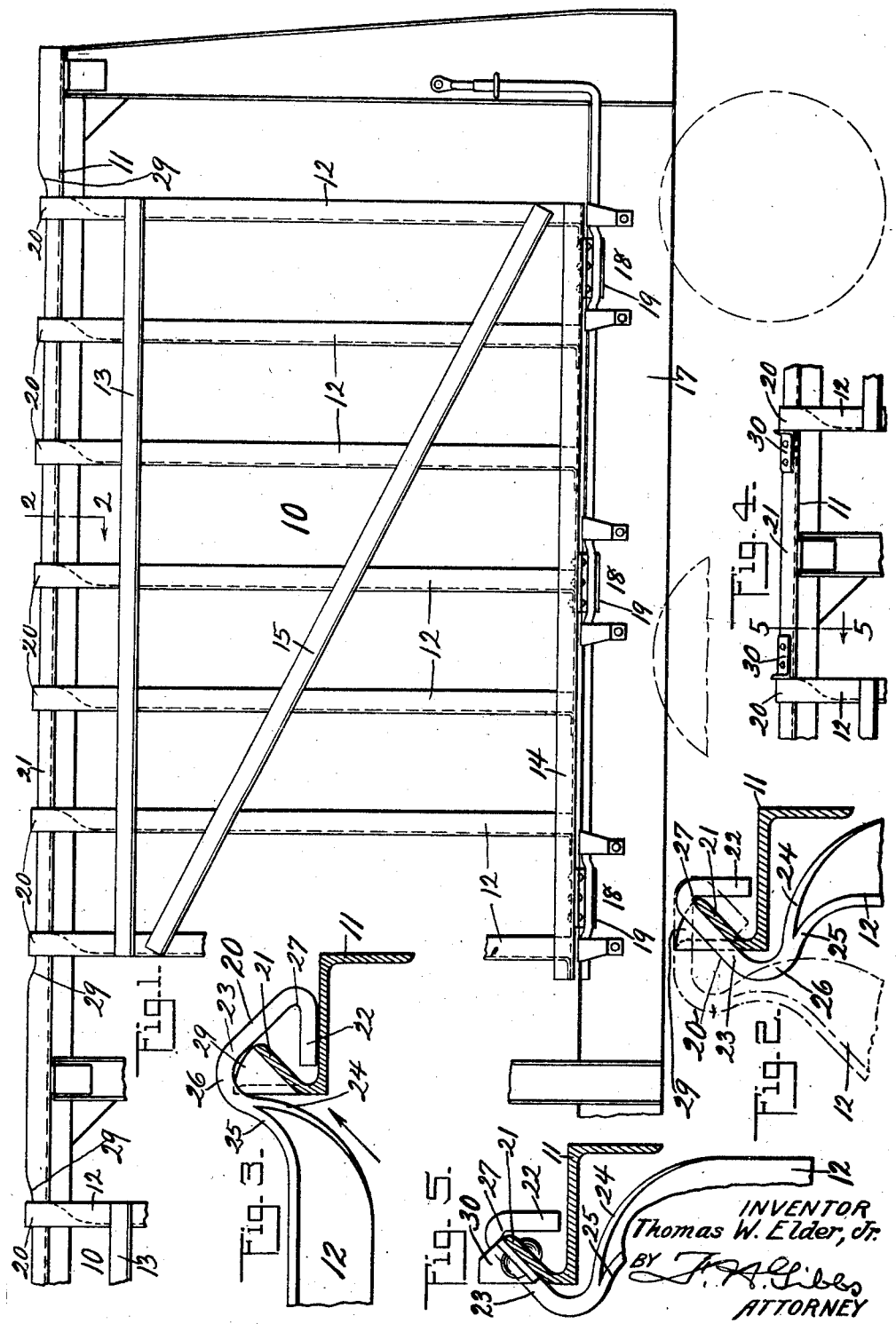

1,631,311

UNITED STATES PATENT OFFICE.

THOMAS W. ELDER, JR., OF BROOKLYN, NEW YORK, ASSIGNOR TO AMERICAN CAR AND FOUNDRY COMPANY, OF NEW YORK, N. Y., A CORPORATION OF NEW JERSEY.

CANE CAR.

Application filed July 28, 1926. Serial No. 125,462.

In the drawings:

Fig. 1 is a partial side view of a cane car having a door mounted in accordance with my invention.

Fig. 2 is a fragmentary view of one of the members of the door shown in Fig. 1, taken at right angles to that figure, with an associated part shown in cross section as indicated by the line 2—2 in Fig. 1, but on a larger scale;

Fig. 3 is a view similar to Fig. 2 with the door member swung outward, illustrating the mounting and dismounting of the door;

Figs. 4 and 5 are fragmentary views similar to Figs. 1 and 2, but illustrating a somewhat different construction.

My invention relates to vertically swinging car doors and the like, and is particularly concerned with the mounting of vertically swinging doors. The invention is especially useful and advantageous for the doors of railway cars such as cane cars, general utility cars, etc. I aim to provide a simple, rugged, convenient and inexpensive door mounting, and to make the door secure on the car in service and at the same time easy to remove when desired.

Fig. 1 shows a cane car of usual type with an open work side door 10 pivoted to a longitudinal "top rail" 11 of the car structure, in a manner to be hereinafter described. The door 10 comprises a series of upright angle bar "stakes" 12 whose upper ends are secured to a longitudinal angle bar 13, and whose lower ends are secured to the inner side of a longitudinal lower rail 14, of angle section. The door as a whole is braced by a diagonal angle bar 15 secured to the uprights 12. The door swings outward to open; while when it closes its lower portion seats laterally against the floor structure or the side sill 17 of the car. The door may be held shut in any suitable manner, as by means of a plurality of locking devices 18 mounted on the side sill 17 and engaging the depending flanges of short angle bars 19 mounted on the lower rail 14 of the door.

For suspending the door 10 from the top rail 11, it is provided with a plurality of hooks 20 adapted to hook over the rail 11 or a portion thereof. These hooks 20 may be attached to the stakes 12, and preferably formed out of their upper ends. As shown in Figs. 1, 2 and 3, the top rail 11 is of angular section, consisting of a Z-bar arranged with its web horizontal and with its lower flange inward and its upper flange 21 outward. Where engaged by the hooks 20, the flange 21 is turned or inclined inward, at an angle which in Fig. 2 is about 45 degrees. As shown in Fig. 2, each of the hooks 20 is of a biangular configuration, with flat down-turned free end 22 hooked inside the flange 21, flat intermediate portion 23 overlying said flange 21 and sloping in substantial conformity to its slope when the door hangs free in its closed position (Fig. 2), and a (curved) shoulder 24 at the junction between the hook and the upper end of the stake 12 proper. Normally, when the door 10 is closed, the shoulder 24 underlies or extends beneath the main body or web of the rail 11, with some clearance between. In the present instance, the outer side of the hook end 22 is substantially in line with the inner side of the stake flange that extends in the direction of the side of the car, and the hook 20 is connected to the upper end of the stake 12 proper by an outward curving shank 25, whose upper side largely forms the shoulder 24. The angle 26 between the shank 25 and the intermediate hook portion 23 is shown well rounded, while the angle 27 between the portions 22 and 23 presents a sharper bend. In forming the hook 20, the upper end of the stake member 12—or, at least, the flange of this member that extends in the direction of the car side— may be bent outward to form the shank 25 and shoulder 24, and upward and inward at 26 and downward at 27 to complete the hook. The transverse flange of the member 12 may be progressively turned and flattened over on the first mentioned flange, or into the same plane with it; or it may be trimmed away on a taper. As here shown, the transverse flange is turned and welded to the other.

In normal operation, the door 10 swings outward freely and easily about the upper edge of the top rail flange 21 as a fulcrum, with very little friction and little or no shifting of the point or line of contact in the sharply rounded bend 27. And the door 10 can open freely in this manner to the extent indicated by the dot and dash position of the stake 12 in Fig. 2,—that is to say, until the depending free end 22 of the hook 20 comes in contact with the inner or rear side of the in-turned flange 21. This is quite as far, however, as there is any occasion for the door to open in ordinary service. Throughout this range of movement, moreover, the door is securely "interlocked" with the top rail 11 by the relation of the shoulder 24 and the hook end 22 to the rail; i. e., any attempt to free the door in any position within this range will be thwarted either by the engagement of the hook end 22 with the flange 21 or by engagement of the shoulder 24 with the lower side of the rail 11.

To dismount or remove the door 10, on the other hand, it is only necessary to swing it outward excessively, beyond the normal range of opening movement indicated in Fig. 2, until the top rail flange 21 points outward through the relatively narrow "throat" between the hook end 22 and the shoulder 24; whereupon the door can be disengaged and freed by merely lifting or pushing it upward and inward off the flange. Such a position of the door is shown in Fig. 3, and a direction of movement to free it is indicated by the arrow in that figure. From a comparison of Figs. 2 and 3, it will be seen that as the door is swung outward beyond the position shown in dot and dash lines in Fig. 2, the corner of the hook end 22 engages the underside of the top rail flange 21 and pushes the intermediate hook portion 23 over the edge or corner of the flange 21 until this portion 23 attains a sufficient upward and outward slope to slide down over said edge by gravity,—to an extent limited by engagement of the hook end 22 with the top rail web. This is the free position for removal shown in Fig. 3, with the free hook ends 22 resting on the rail 11.

As shown in Fig. 1, the top rail flange 21 is turned inward throughout the length of the door 10,—in fact, for a distance exceeding the overall door length from outer stake edge to outer stake edge. This results in helically sloping shoulders 29 in the rail which serve as stops to prevent undesirable longitudinal shifting of the door 10. In Figs. 4 and 5, a somewhat different provision of stops for this purpose is indicated: i. e., the upper flange 21 is turned inward throughout the length of the top rail 11, and angle clip stops 30 are riveted to this inturned flange 21 in position to engage the outer edges of the end stakes 12. These stops 30 form abrupt vertical shoulders which more positively prevent longitudinal shifting of the door 10. In these figures, various parts and features are marked with the same reference characters as in Figs. 1–3, as a means of dispensing with repetitive description.

What is claimed is:

1. The combination with a rail, of a door capable of swinging movement only and having hooks for hooking over said rail and shoulders beneath the rail.

2. The combination with a car rail of a vertically swinging door suspended therefrom and normally interlocked therewith, but disengageable when swung outward beyond its normal range of opening movement.

3. The combination with a rail, of a door with hooks for hooking over said rail and shoulders normally beneath the rail, said door being releasable by swinging the same outward, so as to allow it to be lifted off.

4. The combination with a rail with inturned upper portion, of a door with hooks for hooking over the inturned rail and shoulders extending beneath the rail when the door is closed to prevent the door from lifting off.

5. The combination with a rail having an inturned upper flange, of a door with biangular hooks for hooking over said flange and shoulders normally extending beneath the rail and the free ends of the hooks, so as to prevent disengagement of the hooks, but releasable by an excessive outward swing of the door, so as to allow it to be lifted off.

6. The combination with a rail with inturned upper portion, of a door with hooks for hooking over the inturned rail and shoulders extending beneath the rail when the door is closed to prevent the door from lifting off, but releasable by swinging the door outward until the hooks rest on the rail inside said inturned portion.

7. The combination with a rail having an inturned upper flange, of a door with biangular supporting hooks including downturned free ends for hooking inside said inturned flange, intermediate portions substantially conforming to the slope of said flanges when the door hangs free, and inward extending shanks normally beneath the rail, so as to prevent disengagement of the hooks, but releasable by swinging the door outward until the free hook ends rest on the rail inside said flange.

8. A car door of the character described comprising a series of stakes with their upper ends formed into hooks for hooking over the top rail of a car.

9. A car door of the character described comprising a series of stakes with their upper ends bent outward to afford shoulders and inward and downward to form hooks for hooking over the top rail of a car with said shoulders beneath the rail.

10. In a car or the like having a door supporting rail at the upper portion thereof, means for supporting a door, comprising hooks formed on said door and engaged with said rail, said hooks being so formed as to normally urge the door to closed position but being capable of movement on said rail to permit swinging movement of said door to open the same.

In witness whereof I have hereunto set my hand.

THOMAS W. ELDER, Jr.